(12) United States Patent
Salu et al.

(10) Patent No.: US 12,283,724 B2
(45) Date of Patent: Apr. 22, 2025

(54) EJECTOR AND FUEL CELL-BASED FLARE GAS RECOVERY SYSTEM

(71) Applicant: SAUDI ARABIAN OIL COMPANY, Dhahran (SA)

(72) Inventors: Samusideen Adewale Salu, Ras Tanura (SA); Mohamed A. Soliman, Ras Tanura (SA); Nisar Ahmad Ansari, Ras Tanura (SA); Najamulhasan S. Tirmezi, Ras Tanura (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 440 days.

(21) Appl. No.: 17/817,821

(22) Filed: Aug. 5, 2022

(65) Prior Publication Data
US 2024/0047713 A1 Feb. 8, 2024

(51) Int. Cl.
| | |
|---|---|
| *H01M 8/04089* | (2016.01) |
| *B01D 53/04* | (2006.01) |
| *H01M 8/0444* | (2016.01) |
| *H01M 8/04746* | (2016.01) |
| *H01M 8/12* | (2016.01) |
| *H01M 8/1231* | (2016.01) |

(52) U.S. Cl.
CPC ........ *H01M 8/04089* (2013.01); *B01D 53/04* (2013.01); *H01M 8/04447* (2013.01); *H01M 8/04753* (2013.01); *H01M 8/1231* (2016.02); *B01D 2257/30* (2013.01); *H01M 2008/1293* (2013.01); *H01M 2250/10* (2013.01)

(58) Field of Classification Search
CPC ......... H01M 8/04089; H01M 8/04447; H01M 8/04753; H01M 8/1231; H01M 2008/1293; H01M 2250/10; H01M 8/0618; B01D 53/04
See application file for complete search history.

(56) References Cited

U.S. PATENT DOCUMENTS

| | | |
|---|---|---|
| 8,123,826 B2 | 2/2012 | Pham |
| 9,657,247 B2 | 5/2017 | Zink |
| 10,974,194 B2 | 4/2021 | Al Muhsen |
| 10,981,104 B2 | 4/2021 | Al Muhsen |

(Continued)

OTHER PUBLICATIONS

Syed Peeran; Dr Najam Beg; Innovative, Cost Effective and Simpler Technology to Recover Flare Gas Paper presented at the SPE Middle East Oil & Gas Show and Conference, Manama, Bahrain, Mar. 2015. Paper No. SPE-172745-MS; https://doi.org/10.2118/172745-M.

*Primary Examiner* — Stewart A Fraser
(74) *Attorney, Agent, or Firm* — Vorys, Sater, Seymour and Pease, LLP (57) ABSTRACT

A flare gas recovery system includes an ejector that receives flare gas from a suction line extending from a flare gas header, and further receives a motive fluid that draws the flare gas into the ejector to be mixed with the motive fluid and discharge a recovered gas into a discharge gas line. A solid oxide fuel cell system receives the recovered gas and includes a fuel cell power module that uses the recovered gas to generate electrical power, an anode exhaust, and a cathode exhaust, a combustor that receives and combusts at least a portion of the anode and cathode exhausts and thereby generates waste heat, and a process gas heat exchanger that receives and converts the waste heat into electrical power.

19 Claims, 3 Drawing Sheets

(56) References Cited

U.S. PATENT DOCUMENTS

| | | |
|---|---|---|
| 11,092,334 B2 | 8/2021 | Salu et al. |
| 2015/0338097 A1 | 11/2015 | Ali Beg et al. |
| 2016/0045841 A1 | 2/2016 | Kaplan et al. |
| 2017/0047598 A1* | 2/2017 | Andrzejak .......... E21B 43/2401 |

* cited by examiner

EJECTOR AND FUEL CELL-BASED FLARE GAS RECOVERY SYSTEM

FIELD OF THE DISCLOSURE

The present disclosure relates generally to flare gas recovery systems and, more particularly, to ejector-based flare gas recovery systems combined with solid oxide fuel cell technology.

BACKGROUND OF THE DISCLOSURE

Flare gas disposal systems are often provided in various types of process plants to collect gas vapor releases from assorted processes and channel such releases through a piping network before discharging the gas to the atmosphere in a safe and controlled manner by burning (flaring) the gas. The flare system is an essential part of oil and gas processing plants and rigs, for example.

The flare system serves as one of the last layers of protection for the entire plant by safely relieving pressure from plant equipment during an overpressure condition. As part of safety requirements, flare headers included in the fare systems are normally configured for continuous purging to prevent vacuums within the system, keep air out of the system, and prevent possible explosions. The gas used in continuous purging of the entire flare network system constitutes the major portion of the routine gas flaring in any plant, with minimal addition of gas release derived from leaking valves, which can be eliminated by repairing such valves.

Flare gas recovery systems have been developed to continuously collect and recover routine gas flaring of fixed rates back to the plant or to other destinations through a pipeline framework. Such systems have enabled plant facilities with flare systems to achieve almost hundred percent elimination of normal routine flaring, thereby limiting flare operation to emergency releases and scheduled maintenance venting only. The recovered flare gas can be reused, for example, as valuable fuel or petrochemical feedstock, while simultaneously reducing emissions of noxious gases to the environment.

Flare gas recovery systems often incorporate gas compression technologies to compress the low-pressure flare gas to a pressure needed to convey the gas back to the process. Conventional flare gas recovery systems incorporate the use of "active" compressor systems, such as rotating or reciprocating compressors. Such active compressor systems have recurring maintenance, operating, and reliability issues.

What is needed are alternative flare gas recovery systems that eliminate the use of active gas compression systems, and a system that is capable of converting recovered gas into useful heat and power output.

SUMMARY OF THE DISCLOSURE

Various details of the present disclosure are hereinafter summarized to provide a basic understanding. This summary is not an extensive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a flare gas recovery system can include an ejector that receives flare gas from a suction line extending from a flare gas header, and further receives a motive fluid that draws the flare gas into the ejector to be mixed with the motive fluid and discharge a recovered gas into a discharge gas line, and a solid oxide fuel cell (SOFC) system that receives the recovered gas and includes a fuel cell power module that uses the recovered gas to generate electrical power, an anode exhaust, and a cathode exhaust, a combustor that receives and combusts at least a portion of the anode and cathode exhausts and thereby generates waste heat, and a process gas heat exchanger that receives and converts the waste heat into electrical power.

According to one or more additional embodiments consistent with the present disclosure, a method of operating a flare gas recovery system may include receiving a motive fluid at an ejector and thereby drawing in a flare gas into the ejector from a suction line extending from a flare gas header, mixing the flare gas with the motive fluid in the ejector and discharging a recovered gas into a discharge gas line, and receiving the recovered gas at a solid oxide fuel cell (SOFC) system that includes a fuel cell power module, a combustor, and a process gas heat exchanger, generating electrical power, an anode exhaust, and a cathode exhaust at the fuel cell power module, receiving and combusting at least a portion of the anode and cathode exhausts with the combustor and thereby generating waste heat, and conveying the waste heat to a process gas heat exchanger and converting the waste heat into electrical power at the process gas heat exchanger.

According to one or more additional embodiments consistent with the present disclosure, a flare gas recovery system may include an ejector that receives flare gas from a suction line extending from a flare gas header, and further receives a motive fluid that draws the flare gas into the ejector to be mixed with the motive fluid and discharge a recovered gas into a discharge gas line, and a solid oxide fuel cell (SOFC) system that receives the recovered gas and generates electrical power and waste heat, a pressure sensor arranged to measure a pressure of the flare gas in the suction line, a motive fluid valve arranged in a motive fluid header that conveys the motive fluid to the ejector, and a control system in communication with the pressure sensor and the motive fluid valve, the control system being programmed to operate the motive fluid valve based at least partially on the pressure of the flare gas in the suction line as measured by the pressure sensor.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to flare gas recovery systems and, more particularly, to ejector-based flare gas recovery systems combined with solid oxide fuel cell technology. More specifically, the present disclosure describes the establishment of a flare gas recovery system that can be used to recover routine daily gas flaring in a processing plant. Oil refineries and gas processing facilities can produce large amounts of waste gas, which is commonly piped to adjacent flaring systems designed to dispose of the waste gas via combustion (flaring). Instead of flaring the waste gas into the atmosphere, the flare gas recovery systems described herein recover and use this waste gas and thereby reduce operation costs associated with purchased fuel because some or all of the recovered flare gas can be used as a fuel. The flare gas recovery systems described herein can reduce emissions and prolong the life of the flare stack and associated flare tip. If the recovered flare gas is further processed and cleaned, the flare gas can even be acceptable for venting.

Flare gas recovery systems often use active compression equipment to compress waste gas so that the gas can be recycled back to the plant for various uses. However, instead of using multi-stage compressors, which are typically associated with high capital costs due to associated equipment, installation, and high operation costs, the systems and methods described herein use passive ejectors to compress the waste flare gas. In contrast to rotating or reciprocating multi-stage compressor systems, ejectors are considered static equipment and are generally associated with low capital and operating costs when compared to conventional compressor systems. Ejectors rely on a Venturi effect to pressurize low pressure flare gas, referred to herein as a "suction fluid," by utilizing available pressure from a high-pressure fluid referred to as a "motive fluid." The ejector converts the pressure energy available in the motive fluid to velocity energy, which is able to draw in the suction fluid, mix the two fluids, and discharge the mixture at an intermediate pressure without the use of rotating or moving parts. Thus, the systems described herein may eliminate the need for installing and operating rotating equipment, such as gas compressors, blowers, etc., to recover the low-pressure routine flared gas from the flare lines going to flare stacks.

The systems described herein further incorporate a solid oxide fuel cell (SOFC) system that receives and uses the recovered gas generated by the flare gas recovery system. The SOFC system may be configured to convert the recovered gas into useful combined heat and power output with very low emission, and thus may serve as an alternative and cheaper means of providing final in-situ use for the recovered gas where there is no available existing appropriate compression plant or facility or enough capacity to receive the recovered gas. The flare gas recovery systems described herein may also incorporate the use of an advanced process control system designed to optimize performance and operation of the flare gas recovery system.

Figure 1:
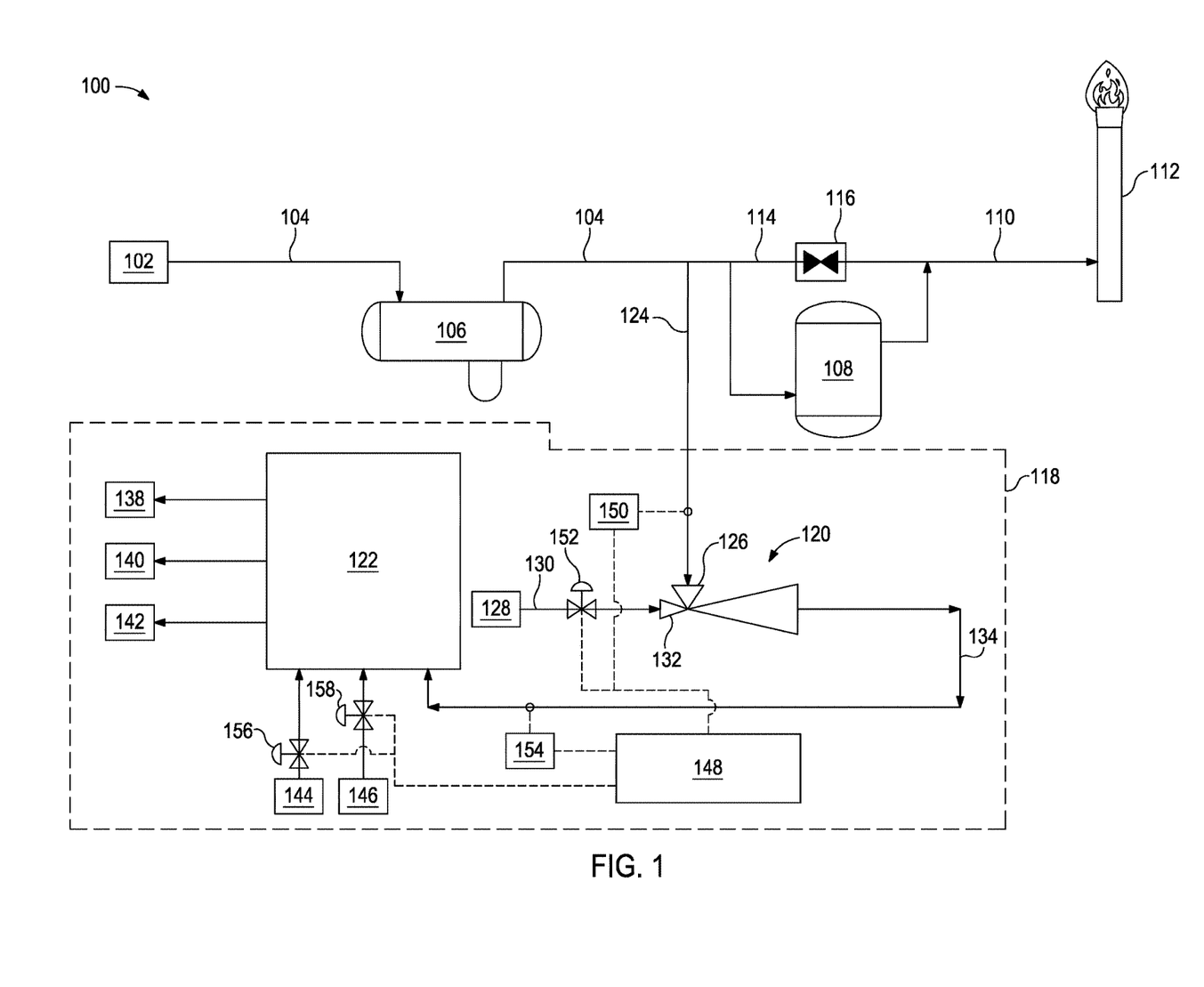
FIG. 1 is a schematic diagram of an example flare gas recovery system, according to one or more embodiments.

FIG. 1 is a schematic diagram of an example flaring system 100, according to one or more embodiments. As illustrated, the flaring system 100 (hereafter the "system 100") includes a supply of flare gas 102 that is received within a flare manifold or header 104. A knock-out drum 106 is arranged in the flare header 104 and is designed to remove and accumulate liquids that may be condensed from the flare gas 102. Also known as a vapor-liquid separator, the knock-out drum 106 is configured to slow down gas flow by creating a pressure drop, which allows liquids and condensate to fall out of the flare gas 102 stream. The flare gas 102 is then returned to the flare header 104 from the knock-out drum 106.

A pressure control and flashback prevention system 108 is arranged downstream from the knock-out drum 106 and helps ensure a positive pressure on the flare header 104. The pressure control and flashback prevention system 108 may comprise a variety of systems, such as a liquid (water) seal drum, a pressure sensor with pressure control valve, or a combination thereof. In embodiments where the pressure control and flashback prevention system 108 comprises a water seal drum, a volume of water is disposed within the system 108, and when the pressure of the flare gas 102 within the water seal drum exceeds the static head of the water, the flare gas 102 breaks the water seal and flows out of the water seal drum and into an interconnected flare line 110 to be conveyed to a flare stack 112. Accordingly, the pressure control and flashback prevention system 108 operates to maintain a slight positive pressure in the flare header 104 and prevents an undesirable vacuum condition that could draft in air from the flare stack 112. Upon reaching the flare stack 112, the flare gas 102 is ignited and its combustion products are distributed into the atmosphere.

An optional bypass line 114 is shown connected between the flare header 104 and the flare line 110, thereby circumventing the pressure control and flashback prevention system 108. The bypass 114 provides an alternate route of gas flow should the pressure control and flashback prevention system 108 fail (e.g., the water seal in the water seal drum fails to break). A block valve 116 is arranged in the bypass 114 and is selectively opened and closed to allow flow through the bypass 114 and between the flare header 104 and the flare line 110. In some embodiments, the block valve 116 may comprise a rupture (burst) disc, but could alternatively comprise a rupture pin or the like.

The system 100 further includes a flare gas recovery system 118 configured to receive at least a portion of the flare gas 102 and convert the recovered gas into useful heat and electrical power with low emissions. As illustrated, the flare gas recovery system 118 includes an ejector 120 and a solid oxide fuel cell (SOFC) system 122 in fluid communication with the ejector 120. The ejector 120, also referred to as a surface jet pump or an eductor, receives a portion of the flare gas 102 from the flare header 104 via a suction line 124. As illustrated, the takeoff point of the suction line 124 from the flare header 104 is located downstream from the knock-out drum 106, but upstream of the pressure control and flashback prevention system 108. The suction line 124 directs the flare gas 102 to a flare gas inlet 126 of the ejector 120.

A supply of motive fluid 128 is conveyed via a motive fluid header or line 130 to a motive gas inlet 132 of the ejector 120. The motive fluid 128 may comprise a high-pressure fluid (e.g., gas, water, or steam) derived from an existing utility supply system of the process plant. As compared to "active" compressor systems, such as rotating or reciprocating compressors, the ejector 120 is a "static" (passive) type of compressor that boosts the pressure of the incoming flare gas 102 without the use of moving parts. More particularly, the ejector 120 utilizes the Venturi effect based on Bernoulli's principle of a converging-diverging nozzle to convert the pressure energy of the high-pressure motive fluid 128 to velocity energy, which creates a low pressure zone within the ejector 120 that draws in and entrains the lower-pressure flare gas 102 from the suction line 124. A mixture of the flare gas 102 and the motive fluid 128 passes through the throat of the ejector 120, and the mixture expands as its velocity is reduced, which recompresses the mixture by converting velocity energy back into pressure energy. The ejector 120 then discharges "recovered gas" into a discharge gas line 134 at an intermediate pressure between the pressures of the flare gas 102 and the motive fluid 128. Pressure within the suction line 124 may range between 3-5 psig, pressure in the motive fluid line 130 may range between 250-350 psig, and pressure of the recovered gas in the discharge gas line 134 may range between 7-15 psig.

The recovered gas discharged from the ejector 120 may be conveyed to the SOFC system 122 via the discharge gas line 134. The ejector 120 boosts the pressure of the low-pressure flare gas 102 to the intermediate pressure, which is required for delivery to the SOFC system 122. As described in more detail below, the SOFC system 122 may be configured to convert the recovered gas into useful heat and electrical power output for utilization in a related (adjacent) oil refinery or gas processing facility or for export to a national electrical grid. More specifically, the SOFC system 122 may convert the recovered gas into combustion exhaust 138, electrical power 140, and waste heat 142. The SOFC system 122 requires input of air 144 for its operation. The SOFC system 122 may also receive water (steam) 146 for make-up or during start-up only since steam is generated internally by the SOFC system 122 itself for recycling to the inlet. The air 144 and the steam 146 requirements of the SOFC system 122 may be supplied from the existing utility system of the process plant.

As described in more detail below, the basic components of the SOFC system 122 can include, but are not limited to, a fuel processor, a fuel-cell power module, power-conditioning equipment for DC-to-AC inversion, and one or more process-gas heat exchangers. Because of its high operating temperature, the SOFC system 122 may produce varying grades of waste heat 142 that can be recovered for process heating, power augmentation via an expander, or exported for cogeneration (or trigeneration) purposes. Efficiently using the waste heat 142 significantly impacts system efficiency, economics, and environmental emissions.

In some embodiments, the system 100 may further include a control system 148 configured and otherwise programmed to monitor the operation and performance of the flare gas recovery system 118. The control system 148, alternately referred to as an advanced process controller (APC), may comprise a computer or computer system that can be employed to execute one or more processes described herein. The control system 148 can be implemented on one or more general purpose networked computer systems, embedded computer systems, routers, switches, server devices, client devices, various intermediate devices/nodes or standalone computer systems. Alternatively, or in addition thereto, the control system 148 may be implemented on various mobile clients such as, for example, a personal digital assistant (PDA), laptop computer, pager, and the like, provided it includes sufficient processing capabilities.

The control system 148 may be in communication with one or more sensors and valves to help efficiently operate the flare gas recovery system 118. For example, the control system 148 may be communicably coupled to the high-pressure motive fluid control valve 152 and may be programmed to actuate or operate the high-pressure motive fluid control valve 152 to control the required amount of motive fluid flow to the ejector at the required pressure to achieve the set intermediate pressure.

Moreover, the control system 148 may also be communicably coupled to a pressure sensor 150 arranged in the suction line 124. The pressure sensor 150 may be configured to monitor the pressure of the flare gas 102 (e.g., the low-pressure suction gas) being delivered to the ejector 120. The overall performance and operation of the ejector 120 may be controlled by throttling the motive fluid 128 at the motive fluid valve 152. The control system 148 may be programmed to operate the motive fluid valve 152 and thereby control the flow of the motive fluid 128 to the ejector 120, and operation of the motive fluid valve 152 may be based, at least in part, on the real-time pressure of the flare gas 102 in the suction line 124, as measured by the pressure sensor 150. Moreover, selectively operating the motive fluid valve 152 may also dictate the resulting pressure of the recovered gas discharged into the discharge gas line 134.

In some embodiments, the system 100 may further include an online analyzer 154 arranged in the discharge gas line 134 and configured to analyze and measure the real-time composition of the recovered gas discharged from the ejector 120. The online analyzer 154 may comprise a type of sensor capable of measuring the concentrations (and percentages) of the different components present in the recovered gas. The control system 148 may be communicably coupled to the online analyzer 154 and configured to monitor the concentrations of the different components in the recovered gas. Based on such measurements, as noted below, the control system 148 may be programmed to control the air ratio and the amount of steam needed to avoid carbon deposits on the anode in the SOFC system 122. The quantity of carbon deposited on the anode is affected by the operating temperature and the methane-to-steam ratio on the anode side, which occurs due to the cracking reaction in the SOFC system 122.

The control system 148 may further be in communication with an air valve 156 arranged in the line that conveys the air 144 to the SOFC system 122, and in communication with a water/steam valve 158 arranged in the line that conveys the steam 146 to the SOFC system 122. Based on measurements derived from the online analyzer 154, the control system 148 may be programmed to actuate (operate) the air and steam valves 156, 158 to ensure proper operation of the SOFC system 122. More specifically, the online analyzer 154 may measure and report concentrations of the different components of the recovered gas to the control system 148, and the control system 148 may be configured or otherwise programmed to actuate the air and steam valves 156, 158 to control the ratio of air 144 and/or the amount of steam 146 required to avoid carbon deposits on the anode of the SOFC system 122. Carbon deposited on the anode occurs due to the cracking reaction, and the quantity of carbon deposited is affected by the operating temperature and the methane-to-steam ratio in the SOFC system 122. Carbon formation could result in the deactivation of the anode material, which leads to the loss of fuel cell performance.

In some embodiments, the control system 148 may use model predictive controllers in combination with machine learning and artificial intelligence to monitor and control the overall performance of the SOFC system 122 while manipulating the flow rate of the motive fluid 128, the air 144, and the steam 146. The prediction models for such process variables may be built using mechanistic models or by experiment during a training phase or by using the artificial intelligence of the historical data. Also, the control system 148 may be used to avoid violating hard constraints of the SOCF system 122, like carbon deposition on the anode.

The control system 148 may be configured to monitor and control various variables of the flare gas recovery system 118 including, but not limited to, the pressure of the low-pressure flare gas 102 in the suction line 124, the flow rate of the high-pressure motive gas in the gas line 130, and the composition of the recovered gas in the recovered gas line 134. Moreover, the control system 148 may be configured to manipulate various variables of the flare gas recovery system 118 including, but not limited to, the flow rate of the motive fluid 128 in the motive fluid header 130, the flow rate of the air 144, the flow rate of the steam 146, and the operating temperature of the SOFC system 122.

Figure 2:
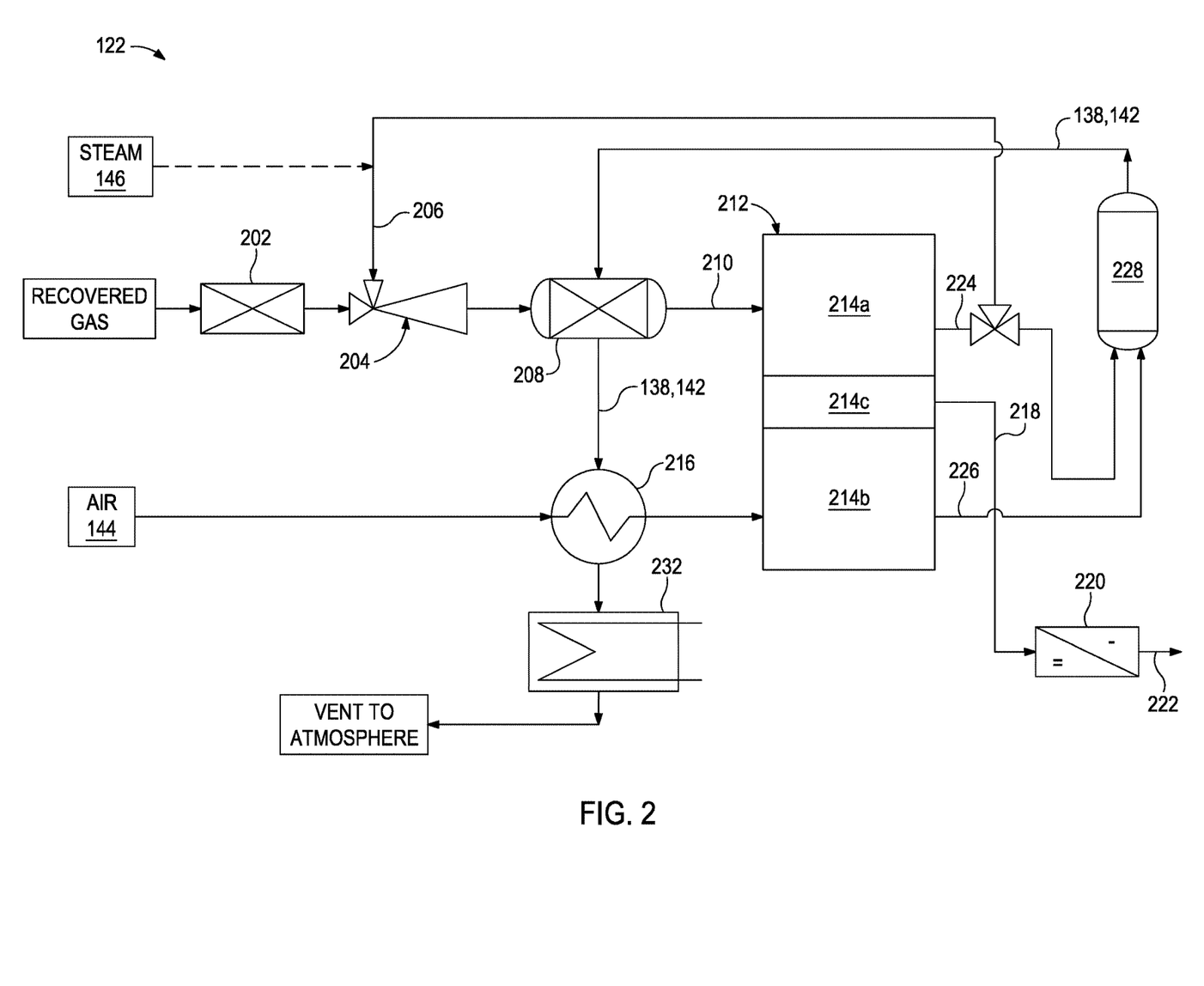
FIG. 2 is a schematic diagram of the solid oxide fuel cell system of FIG. 1, according to one or more embodiments.

FIG. 2 is a schematic diagram of the solid oxide fuel cell (SOFC) system 122, according to one or more embodiments. As illustrated, the SOFC system 122 can include a desulfurizer 202 that receives the recovered gas discharged from the ejector 120 (FIG. 1). The desulfurizer 202 is designed to adsorb sulfur species that may be present in the recovered gas, and may comprise a fixed bed configuration packed with adsorbents. In other applications, however, the desulfurizer may be designed for high temperature desulfurization and may include a bed of cobalt-molybdenum catalysts followed by a zinc oxide adsorbent bed. In such embodiments, the operating temperature of the desulfurizer may be around 400° C.

In some embodiments, the desulfurized recovered gas discharged from the desulfurizer 202 may be introduced into an anode recycle ejector 204 included in the SOFC system 122. The desulfurized recovered gas acts as the motive fluid that drives operation of the ejector 204 by entraining a portion of an anode exhaust stream (e.g., a suction fluid) conveyed within an anode exhaust line 206. The desulfurized recovered gas and the anode exhaust thoroughly mix within the ejector 204, which discharges the mixture to be received by a reformer 208. The reformer 208 is essentially a chemical reactor containing noble metal catalysts designed to react the desulfurized recovered gas with steam (and air) and discharge a reformed fuel 210 The reformed fuel 210 may comprise a mixture of hydrogen, carbon monoxide, carbon dioxide, steam, and methane. In some cases, the amount of the anode exhaust re-circulated to the anode recycle ejector 204 via the anode exhaust line 206 may be determined by how much steam is needed for the reforming reactions in the reformer 208.

The reformed fuel 210 is then conveyed to and introduced into a fuel cell power module 212, which includes an anode 214a, a cathode 214b, and an electrolyte 214c that interposes the anode 214a and the cathode 214b. The anode 214a, the cathode 214b, and the electrolyte 214c may each comprise thin ceramic plates (e.g., 100×100 mm) made from components found in beach sand. The anode 214a may be coated with a green nickel oxide-based ink, and the cathode 214b may be coated with a black ink made of lanthanum strontium manganite. The electrolyte 214c may be made of or otherwise coated with yttria stabilized zirconia, scandium ceria stabilized zirconia, gadolinium doped ceria stabilized zirconia, or samarium doped ceria stabilized zirconia at the various fractions of the active materials yttria, scandium, gadolinium and samarium.

The reformed fuel 210 is conveyed through the anode 214a while air 144 is simultaneously conveyed through the cathode 214b. In some embodiments, as illustrated, the air 144 may be pre-heated in an air preheater 216 prior to being introduced into the cathode 214b. The air 144 may be pre-heated, for example, to a temperature ranging between 500-600° C. The electrolyte 214c only allows the oxygen ions from the cathode 214b to pass to the anode 214a, and the chemical reaction between the oxygen ions and the reformed fuel 210 generates electricity, water (steam), heat and small amount of carbon dioxide as follows:

$$CH_4 + 2O_2 \rightarrow CO_2 + 2H_2O + \text{Electricity} + \text{Heat}$$

At least a portion of the steam and the heat generated by the chemical reaction can be reused to repeat the process, as described herein.

As illustrated, DC power 218 may be generated from the chemical reaction in the fuel cell power module 212. In some embodiments, the DC power 218 may be used in one or more downstream applications, such as being utilized in a related (adjacent) oil refinery or gas processing facility, or may otherwise be exported to a national electrical grid. In other embodiments, the DC power 218 may be conveyed to a DC/AC inverter 220 designed to change the DC power 218 to AC power 222 that can be used for a variety of downstream applications requiring an AC power supply.

A portion of the anode exhaust 224 may be conveyed to the ejector 204 via the anode exhaust line 206. The anode exhaust 224 may be rich in steam, and the amount re-circulated to the ejector 204 may be determined by how much steam is required for the reforming reactions undertaken in the reformer 208. In some embodiments, if needed to make-up or supplement the amount of steam recycled through the anode exhaust 224, additional steam 146 may be added to the SOFC system 122 at the anode exhaust line 206. In some embodiments, the amount of re-circulated anode exhaust 224 can be controlled by the upstream pressure of the recovered gas. As indicated above, selectively operating the motive fluid valve 152 (FIG. 1) with the control system 148 (FIG. 1) may determine the resulting pressure of the recovered gas. Thus the amount of re-circulated anode exhaust 224 may essentially be controlled using the control system 148. The remaining portion of the anode exhaust 224 and a cathode exhaust 226 discharged from the cathode 214b are fed to a combustor 228 in which unspent hydrocarbon fuel in the anode exhaust 224 is either catalytically or non-catalytically combusted to recover the calorific value of the anode exhaust 224.

The combustor 228 discharges the combustion exhaust 138, as described above with reference to FIG. 1, which may be used as a source of heat and may thus also include the waste heat 142, also described above with reference to FIG. 1. As illustrated, the combustion exhaust 138/waste heat 142 may be conveyed to the reformer 208 to increase the temperature of the catalyst reaction in the reformer 208. In some embodiments, for example, circulating the combustion exhaust 138/waste heat 142 through the reformer 208 may increase the temperature of the catalyst reaction to a temperature ranging between about 600-800° C.

The combustion exhaust 138/waste heat 142 discharged from the reformer 208 may then be conveyed to the air preheater 216 to increase the temperature of the air 144 prior to being introduced into the cathode 214b. In some embodiments, for example, circulating the combustion exhaust 138/waste heat 142 through the air preheater 216 may increase the temperature of the air 144 to a temperature ranging between about 500-600° C.

In some embodiments, the combustion exhaust 138/waste heat 142 discharged from the air preheater 216 may then be conveyed to a process gas heat exchanger 232 to further utilize the thermal value of the combustion exhaust 138/waste heat 142 and thereby generate electrical power. Operation of the heat exchanger 232 to generate electrical power may be based on several types of heat recovery technologies including, but not limited to, an organic Rankine cycle (ORC), Stirling engine technology (SET), or a thermoelectric generator (TEG). Using ORC or SET for heat recovery at the heat exchanger 232 will introduce rotating equipment into the SOFC system 122, thus, if it is desired to have a totally static (passive) equipment-based system, utilizing a TEG at the heat exchanger 232 for waste heat recovery may be preferred.

Alternatively, or in addition thereto, in applications where a need for heating fluid is required, the heat exchanger 232 may comprise a variety of types of heat transfer devices including, but not limited to, a shell and tube heat exchanger, a plate heat exchanger, a plate and shell heat exchanger, an adiabatic wheel heat exchanger, a plate fin heat exchanger, a finned tube heat exchanger, a pillow plate heat exchanger, a dynamic scraped surface heat exchanger, a phase-change heat exchanger, a direct contact heat exchanger, a microchannel heat exchanger, or any combination thereof. After the thermal value of the combustion exhaust 138/waste heat 142 is utilized, the heat exchanger 232 then discharges the combustion exhaust 138 to be vented to the atmosphere.

The SOFC system 122 depicted in FIG. 2 shows a single fuel cell power module 212. However, it is contemplated herein that a large number of fuel cell power modules 212 can be stacked (combined) together in a modular configuration to provide power generation capacity ranging from 200 kW to multi Megawatts (e.g., up to at least 500 MW). The high operating temperature and solid state electrolyte 214c in the fuel cell power module 212 produces attractive benefits for a variety of applications, including portable (50-1000 W), mobile (500 W-20 kW), stationary residential and commercial (1 kW-1 MW), industrial (1-5 MW), and central utility (>100 MW) power systems.

Figure 3:
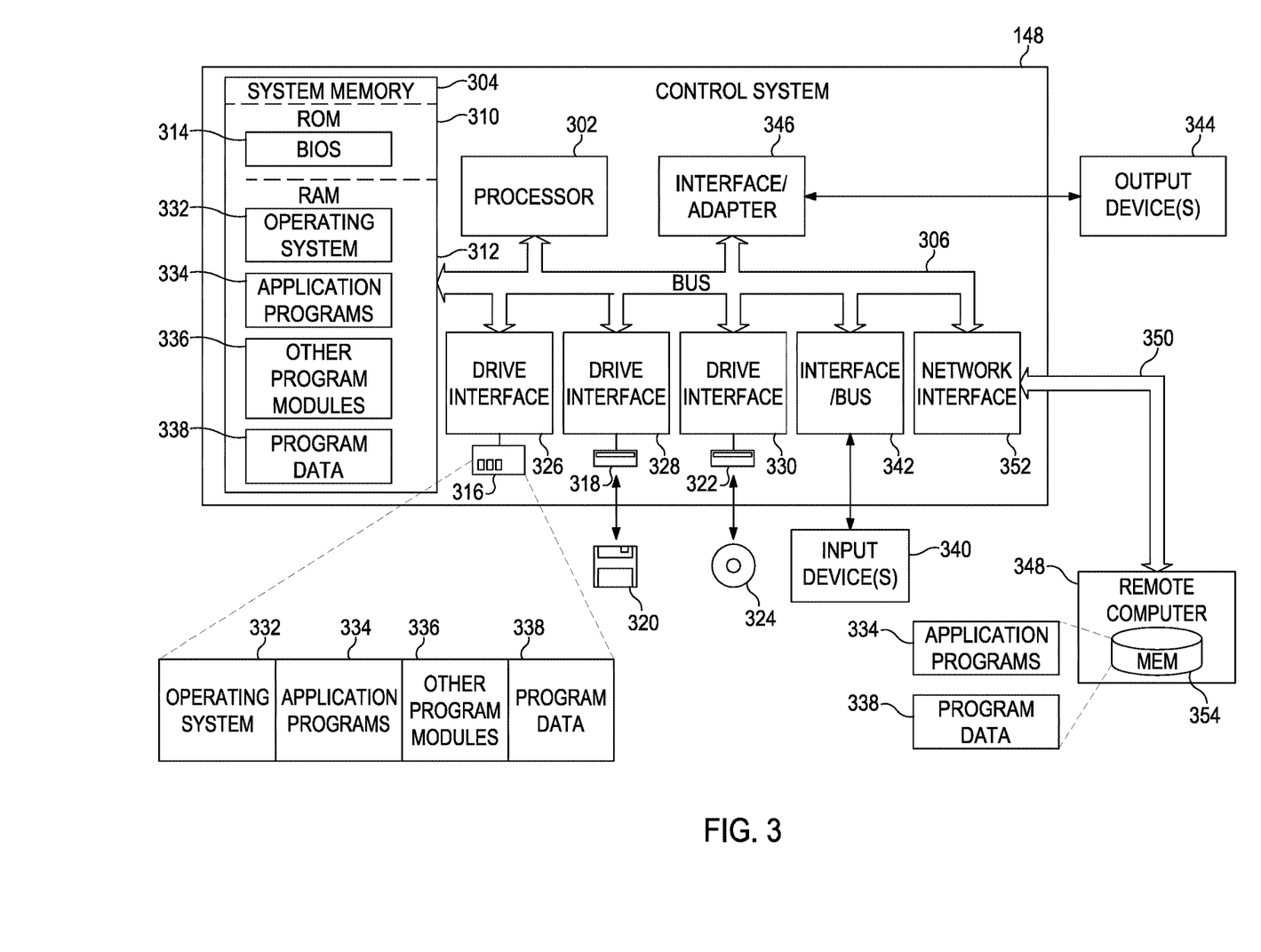
FIG. 3 is a schematic block diagram of the control system of FIG. 1, according to one or more embodiments.

FIG. 3 is a block diagram of the control system 148 of FIG. 1, according to one or more embodiments. In view of the foregoing structural and functional description, those skilled in the art will appreciate that portions of the embodiments may be embodied as a method, data processing system, or computer program product executed by the control system 148. Furthermore, portions of the embodiments may be a computer program product on a computer-usable storage medium having computer readable program code on the medium. Any non-transitory, tangible storage media possessing structure may be utilized including, but not limited to, static and dynamic storage devices, hard disks, optical storage devices, and magnetic storage devices, but excludes any medium that is not eligible for patent protection under 35 U.S.C. § 101 (such as a propagating electrical or electromagnetic signal per se). As an example and not by way of limitation, a computer-readable storage media may include a semiconductor-based circuit or device or other IC (such, as for example, a field-programmable gate array (FPGA) or an ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. A computer-readable non-transitory storage medium may be volatile, nonvolatile, or a combination of volatile and non-volatile, where appropriate.

Certain embodiments have also been described herein as methods, which can be implemented by computer-executable instructions. These computer-executable instructions may be provided to one or more processor of a general purpose computer, special purpose computer, or other programmable data processing apparatus (or a combination of devices and circuits) to produce a machine, such that the instructions which execute via the processor, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

In this regard, FIG. 3 illustrates one example of the control system 148 that can be employed to execute one or more embodiments of the present disclosure. The control system 148 can be implemented on one or more general purpose networked computer systems, embedded computer systems, routers, switches, server devices, client devices, various intermediate devices/nodes or standalone computer systems. Additionally, the control system 148 can be implemented on various mobile clients such as, for example, a personal digital assistant (PDA), laptop computer, pager, and the like, provided it includes sufficient processing capabilities.

The control system 148 includes a processing unit 302, a system memory 304, and a system bus 306 that couples various system components, including the system memory 304, to the processing unit 302. Dual microprocessors and other multi-processor architectures also can be used as the processing unit 302. The system bus 306 may be any of several types of bus structure including a memory bus or memory controller, a peripheral bus, and a local bus using any of a variety of bus architectures. The system memory 304 includes read only memory (ROM) 310 and random access memory (RAM) 312. A basic input/output system (BIOS) 314 can reside in ROM 310 containing the basic routines that help to transfer information among elements within control system 148.

The control system 148 can include a hard disk drive 316, a magnetic disk drive 318, e.g., to read from or write to a removable disk 320, and an optical disk drive 322, e.g., for reading CD-ROM disk 324 or to read from or write to other optical media. The hard disk drive 316, the magnetic disk drive 318, and the optical disk drive 322 are connected to the system bus 306 by a hard disk drive interface 326, a magnetic disk drive interface 328, and an optical drive interface 330, respectively. The drives and associated computer-readable media provide nonvolatile storage of data, data structures, and computer-executable instructions for control system 148. Although the description of computer-readable media above refers to a hard disk, a removable magnetic disk and a Cl), other types of media that are readable by a computer, such as magnetic cassettes, flash memory cards, digital video disks and the like, in a variety of forms, may also be used in the operating environment; further, any such media may contain computer-executable instructions for implementing one or more parts of embodiments shown and described herein.

A number of program modules may be stored in drives and RAM 310, including an operating system 332, one or more application programs 334, other program modules 336, and program data 338. The application programs 334 and program data 338 can include functions and methods programmed to monitor and control the operation and performance of the flare gas recovery system 118, such as shown and described herein.

A user may enter commands and information into the control system 148 through one or more input devices 340, such as a pointing device (e.g., a mouse, touch screen), keyboard, microphone, joystick, game pad, scanner, and the like. These and other input devices 340 are often connected to the processing unit 302 through a corresponding port interface 342 that is coupled to the system bus 306, but may be connected by other interfaces, such as a parallel port, serial port, or universal serial bus (USB). One or more output devices 344 (e.g., display, a monitor, printer, projector, or other type of displaying device) may also be connected to the system bus 306 via an interface 346, such as a video adapter.

The control system 148 may operate in a networked environment using logical connections to one or more remote computers, such as a remote computer 348. The remote computer 348 may be a workstation, a computer system, a router, a peer device, or other common network node, and typically includes many or all the elements described relative to the control system 148. The logical connections, schematically indicated at 350, can include a local area network (LAN) and a wide area network (WAN). When used in a LAN networking environment, the control system 148 can be connected to the local network through a network interface or adapter 352. When used in a WAN networking environment, the control system 148 can include a modem, or can be connected to a communications server on the LAN. The modem, which may be internal or external, can be connected to the system bus 306 via an appropriate port interface. In a networked environment, the application programs 334 or the program data 338 depicted relative to the computer system 300, or portions thereof, may be stored in a remote memory storage device 354.

Embodiments disclosed herein include:

A. A flare gas recovery system that includes an ejector configured to receive flare gas from a suction line extending from a flare gas header, and to receive a motive fluid that draws the flare gas into the ejector to be mixed with the motive fluid and discharge a recovered gas into a discharge gas line, and a solid oxide fuel cell (SOFC) system configure to receive the recovered gas and including a fuel cell power module that uses the recovered gas to generate electrical power, an anode exhaust, and a cathode exhaust, a combustor configured to receive and combust at least a portion of the anode and cathode exhausts and thereby generate waste heat, and a process gas heat exchanger configured to receive and convert the waste heat into electrical power.

B. A method of operating a flare gas recovery system, the method including the steps of receiving a motive fluid at an ejector and thereby drawing in a flare gas into the ejector from a suction line extending from a flare gas header, mixing the flare gas with the motive fluid in the ejector and discharging a recovered gas into a discharge gas line, receiving the recovered gas at a solid oxide fuel cell (SOFC) system that includes a fuel cell power module, a combustor, and a process gas heat exchanger, generating electrical power, an anode exhaust, and a cathode exhaust at the fuel cell power module, receiving and combusting at least a portion of the anode and cathode exhausts with the combustor and thereby generating waste heat, and conveying the waste heat to a process gas heat exchanger and converting the waste heat into electrical power at the process gas heat exchanger.

C. A flare gas recovery system that includes an ejector configured to receive flare gas from a suction line extending from a flare gas header, and to receive a motive fluid that draws the flare gas into the ejector to be mixed with the motive fluid and discharge a recovered gas into a discharge gas line, a solid oxide fuel cell (SOFC) system configured to receive the recovered gas and generate electrical power and waste heat, a pressure sensor configured to measure a pressure of the flare gas in the suction line, a motive fluid valve arranged in a motive fluid header that conveys the motive fluid to the ejector, and a control system in communication with the pressure sensor and the motive fluid valve, the control system being programmed to operate the motive fluid valve based at least partially on the pressure of the flare gas in the suction line as measured by the pressure sensor.

Each of embodiments A, B, and C may have one or more of the following additional elements in any combination: Element 1: wherein the suction line extends from the flare gas header at a location downstream from a knock-out drum and upstream of a pressure control and flashback prevention system. Element 2: further comprising a pressure sensor arranged to measure a pressure of the flare gas in the suction line, a motive fluid valve arranged in a motive fluid header that conveys the motive fluid to the ejector, and a control system in communication with the pressure sensor and the motive fluid valve, the control system being programmed to operate the motive fluid valve based at least partially on the pressure of the flare gas in the suction line as measured by the pressure sensor. Element 3: further comprising an air valve arranged in a first line that conveys air to the SOFC system, a steam valve arranged in a second line that conveys steam to the SOFC system, and an online analyzer arranged in the discharge gas line to analyze a real-time composition of the recovered gas, wherein the control system is in communication with the air valve, the steam valve, and the online analyzer, the control system being further programmed to control operation of the air and steam valves based on a measurement obtained by the online analyzer. Element 4: wherein the SOFC system further includes a desulfurizer that receives the recovered gas and discharges a desulfurized recovered gas, an anode recycle ejector that receives the desulfurized recovered gas and draws in a portion of the anode exhaust into the ejector to discharge a mixture of the desulfurized recovered gas and the portion of the anode exhaust fuel, and a reformer that receives and reacts with the mixture to generate a reformed fuel to be received by the fuel cell power module. Element 5: wherein the waste heat is conveyed through the reformer prior to being received at the process gas heat exchanger. Element 6: wherein the fuel cell power module comprises an anode that receives the reformed fuel and generates the anode exhaust, a cathode that receives air and generates the cathode exhaust, and an electrolyte the interposes the anode and the cathode and generates the electrical power of fuel cell power module, wherein the waste heat is conveyed through an air preheater that pre-heats the air prior to being received at the process gas heat exchanger. Element 7: wherein the process gas heat exchanger operates in accordance with a heat recovery technology selected from the group consisting of an organic Rankine cycle, stirling engine technology, and a thermo-electric generator. Element 8: wherein the electrical power generated by the fuel cell power module comprises direct current (DC) power, and wherein the SOFC system further comprises an inverter that converts the DC power into alternating current (AC) power.

Element 9: further comprising measuring a pressure of the flare gas with a pressure sensor arranged in the suction line, the pressure sensor being in communication with a control system, regulating a flow of the motive fluid to the ejector with a motive fluid valve arranged in a motive fluid header that conveys the motive fluid to the ejector, the motive fluid valve being in communication with the control system, and operating the motive fluid valve with the control system based at least partially on the pressure of the flare gas. Element 10: wherein the flare gas recovery system further includes a discharge control valve arranged in the discharge gas line, the discharge control valve being in communication with the control system, the method further comprising controlling operation of the discharge control valve with the control system and thereby controlling a flow of the recovered gas in the discharge gas line and diverting a portion of the discharged gas to the flare header. Element 11: wherein the flare gas recovery system further includes an air valve arranged in a first line that conveys air to the SOFC system, a steam valve arranged in a second line that conveys steam to the SOFC system, and an online analyzer arranged in the discharge gas line, the method further comprising analyzing a composition of the recovered gas with the online analyzer, wherein the control system is in communication with the air valve, the steam valve, and the online analyzer, and controlling operation of the air and steam valves with the control system based on a measurement obtained by the online analyzer. Element 12: wherein the SOFC system further includes a desulfurizer, an anode recycle ejector, and a reformer, the method further comprising receiving the recovered gas at the desulfurizer and discharging a desulfurized recovered gas from the desulfurizer, receiving the desulfurized recovered gas at the anode recycle ejector and thereby drawing in a portion of the anode exhaust into the ejector, discharging a mixture of the desulfurized recovered gas and the portion of the anode exhaust fuel from the ejector, and receiving the mixture at the reformer and discharging a reformed fuel from the reformer to be received by the fuel cell power module. Element 13: wherein receiving the waste heat at the process gas heat exchanger is preceded by conveying the waste heat through the reformer. Element 14: wherein the fuel cell power module comprises an anode that receives the reformed fuel and generates the anode exhaust, a cathode that receives air and generates the cathode exhaust, and an electrolyte the interposes the anode and the cathode and generates the electrical power of fuel cell power module, and wherein receiving the waste heat at the process gas heat exchanger is preceded by conveying the waste heat conveyed through an air preheater and thereby pre-heating the air prior to being received at the process gas heat exchanger.

Element 15: further comprising a discharge control valve arranged in the discharge gas line and in communication with the control system, the control system being further programmed to control the discharge control valve and thereby control a flow of the recovered gas in the discharge gas line and divert a portion of the discharged gas to the flare header. Element 16: further comprising an air valve arranged in a first line that conveys air to the SOFC system, a steam valve arranged in a second line that conveys steam to the SOFC system, and an online analyzer arranged in the discharge gas line to analyze a real-time composition of the recovered gas, wherein the control system is in communication with the air valve, the steam valve, and the online analyzer, the control system being further programmed to control operation of the air and steam valves based on a measurement obtained by the online analyzer.

By way of non-limiting example, exemplary combinations applicable to A, B, and C include: Element 2 with Element 3; Element 4 with Element 5; Element 4 with Element 6; Element 9 with Element 10; Element 9 with Element 11; Element 12 with Element 13; and Element 12 with Element 14.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation are used herein merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, as used herein, the terms "coupled" or "coupled to" or "connected" or "connected to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims.

The invention claimed is:

1. A flare gas recovery system, comprising:
  an ejector configured to receive flare gas from a suction line extending from a flare gas header, and to receive a motive fluid that draws the flare gas into the ejector to be mixed with the motive fluid and discharge a recovered gas into a discharge gas line; and
  a solid oxide fuel cell (SOFC) system configured to receive the recovered gas and includes:
    a fuel cell power module configured to use the recovered gas to generate electrical power, an anode exhaust, and a cathode exhaust;

a combustor configured to receive and combust at least a portion of the anode and cathode exhausts and thereby generate waste heat; and a process gas heat exchanger configured to receive and convert the waste heat into electrical power.

2. The system of claim 1, wherein the suction line extends from the flare gas header at a location downstream from a knock-out drum and upstream of a pressure control and flashback prevention system.

3. The system of claim 1, further comprising:

a pressure sensor arranged to measure a pressure of the flare gas in the suction line;

a motive fluid valve arranged in a motive fluid header that conveys the motive fluid to the ejector; and a control system in communication with the pressure sensor and the motive fluid valve, the control system being programmed to operate the motive fluid valve based at least partially on the pressure of the flare gas in the suction line as measured by the pressure sensor.

4. The system of claim 3, further comprising:

an air valve arranged in a first line that conveys air to the SOFC system;

a steam valve arranged in a second line that conveys steam to the SOFC system; and an online analyzer arranged in the discharge gas line to analyze a real-time composition of the recovered gas, wherein the control system is in communication with the air valve, the steam valve, and the online analyzer, the control system being further programmed to control operation of the air and steam valves based on a measurement obtained by the online analyzer.

5. The system of claim 1, wherein the SOFC system further includes:

a desulfurizer that receives the recovered gas and discharges a desulfurized recovered gas;

an anode recycle ejector that receives the desulfurized recovered gas and draws in a portion of the anode exhaust into the ejector to discharge a mixture of the desulfurized recovered gas and the portion of the anode exhaust fuel; and a reformer that receives and reacts with the mixture to generate a reformed fuel to be received by the fuel cell power module.

6. The system of claim 5, wherein the waste heat is conveyed through the reformer prior to being received at the process gas heat exchanger.

7. The system of claim 5, wherein the fuel cell power module comprises:

an anode that receives the reformed fuel and generates the anode exhaust;

a cathode that receives air and generates the cathode exhaust; and an electrolyte the interposes the anode and the cathode and generates the electrical power of fuel cell power module, wherein the waste heat is conveyed through an air preheater that pre-heats the air prior to being received at the process gas heat exchanger.

8. The system of claim 1, wherein the process gas heat exchanger operates in accordance with a heat recovery technology selected from the group consisting of an organic Rankine cycle, Stirling engine technology, and a thermoelectric generator.

9. The system of claim 1, wherein the electrical power generated by the fuel cell power module comprises direct current (DC) power, and wherein the SOFC system further comprises an inverter that converts the DC power into alternating current (AC) power.

10. A method of operating a flare gas recovery system, comprising:

receiving a motive fluid at an ejector and thereby drawing in a flare gas into the ejector from a suction line extending from a flare gas header;

mixing the flare gas with the motive fluid in the ejector and discharging a recovered gas into a discharge gas line;

receiving the recovered gas at a solid oxide fuel cell (SOFC) system that includes a fuel cell power module, a combustor, and a process gas heat exchanger;

generating electrical power, an anode exhaust, and a cathode exhaust at the fuel cell power module;

receiving and combusting at least a portion of the anode and cathode exhausts with the combustor and thereby generating waste heat; and conveying the waste heat to a process gas heat exchanger and converting the waste heat into electrical power at the process gas heat exchanger.

11. The method of claim 10, further comprising:

measuring a pressure of the flare gas with a pressure sensor arranged in the suction line, the pressure sensor being in communication with a control system;

regulating a flow of the motive fluid to the ejector with a motive fluid valve arranged in a motive fluid header that conveys the motive fluid to the ejector, the motive fluid valve being in communication with the control system; and operating the motive fluid valve with the control system based at least partially on the pressure of the flare gas.

12. The method of claim 11, wherein the flare gas recovery system further includes a discharge control valve arranged in the discharge gas line, the discharge control valve being in communication with the control system, the method further comprising controlling operation of the discharge control valve with the control system and thereby controlling a flow of the recovered gas in the discharge gas line and diverting a portion of the discharged gas to the flare header.

13. The method of claim 11, wherein the flare gas recovery system further includes an air valve arranged in a first line that conveys air to the SOFC system, a steam valve arranged in a second line that conveys steam to the SOFC system, and an online analyzer arranged in the discharge gas line, the method further comprising:

analyzing a composition of the recovered gas with the online analyzer, wherein the control system is in communication with the air valve, the steam valve, and the online analyzer; and controlling operation of the air and steam valves with the control system based on a measurement obtained by the online analyzer.

14. The method of claim 10, wherein the SOFC system further includes a desulfurizer, an anode recycle ejector, and a reformer, the method further comprising:

receiving the recovered gas at the desulfurizer and discharging a desulfurized recovered gas from the desulfurizer;

receiving the desulfurized recovered gas at the anode recycle ejector and thereby drawing in a portion of the anode exhaust into the ejector;

discharging a mixture of the desulfurized recovered gas and the portion of the anode exhaust fuel from the ejector; and receiving the mixture at the reformer and discharging a reformed fuel from the reformer to be received by the fuel cell power module.

15. The method of claim 14, wherein receiving the waste heat at the process gas heat exchanger is preceded by conveying the waste heat through the reformer.

16. The method of claim 14, wherein the fuel cell power module comprises an anode that receives the reformed fuel and generates the anode exhaust, a cathode that receives air and generates the cathode exhaust, and an electrolyte the interposes the anode and the cathode and generates the electrical power of fuel cell power module, and wherein receiving the waste heat at the process gas heat exchanger is preceded by conveying the waste heat conveyed through an air preheater and thereby preheating the air prior to being received at the process gas heat exchanger.

17. A flare gas recovery system, comprising:

an ejector configured to receive flare gas from a suction line extending from a flare gas header, and to receive a motive fluid that draws the flare gas into the ejector to be mixed with the motive fluid and discharge a recovered gas into a discharge gas line;

a solid oxide fuel cell (SOFC) system configured to receive the recovered gas and generate electrical power and waste heat;

a pressure sensor configured to measure a pressure of the flare gas in the suction line;

a motive fluid valve arranged in a motive fluid header that conveys the motive fluid to the ejector; and a control system in communication with the pressure sensor and the motive fluid valve, the control system being programmed to operate the motive fluid valve based at least partially on the pressure of the flare gas in the suction line as measured by the pressure sensor.

18. The system of claim 17, further comprising a discharge control valve arranged in the discharge gas line and in communication with the control system, the control system being further programmed to control the discharge control valve and thereby control a flow of the recovered gas in the discharge gas line and divert a portion of the discharged gas to the flare header.

19. The system of claim 17, further comprising:

an air valve arranged in a first line that conveys air to the SOFC system;

a steam valve arranged in a second line that conveys steam to the SOFC system; and an online analyzer arranged in the discharge gas line to analyze a real-time composition of the recovered gas, wherein the control system is in communication with the air valve, the steam valve, and the online analyzer, the control system being further programmed to control operation of the air and steam valves based on a measurement obtained by the online analyzer.

\* \* \* \* \*